United States Patent

[11] 3,614,370

[72] Inventor Caroli Italo
    Westmount, Quebec, Canada
[21] Appl. No. 90,673
[22] Filed Nov. 18, 1970
[45] Patented Oct. 19, 1971
[73] Assignee DBM Industries Limited
[32] Priority Sept. 21, 1970
[33] Canada
[31] 93,611

[54] ELECTRODE HOLDER
    6 Claims, 6 Drawing Figs.
[52] U.S. Cl. ..................................... 219/69 E,
    13/17, 204/143 M, 314/133
[51] Int. Cl. ..................................... B23p 1/08,
    B23p 1/04
[50] Field of Search ........................... 13/17;
    204/143 M; 219/69 E; 314/133

[56] References Cited
    UNITED STATES PATENTS
    2,906,799   9/1959   Schlienger ............... 13/17
    3,474,215  10/1969   Johanson ............... 219/69 E Primary Examiner—Ralph F. Staubly
Attorney—Cushman, Darby & Cushman ABSTRACT: An electrode holder is described that is adapted to be used with an electric discharge machine which has an electrically conductive electrode. The electrode holder has a main housing that is generally annular to define a central opening having a central axis along which the electrode is fed during use. A base element is rotatably supported by the main housing, within the central opening. An adjusting ring is also supported by the base element to be movable relative thereto. The adjusting ring is provided with stop means which extend through cooperating slots provided in the base element. Electrically nonconductive guide rollers are disposed symmetrically about the central axis to guidingly engage the electrode. These guide rollers are supported by the base element and are biased against the stop means, with adjustment means being provided to effect relative movement between the base element and adjusting ring such that the positioning of the guide rollers relative to the central axis can be varied. In one preferred form, the main housing of the electrode holder is adjustably supported in a collar provided on a support stand. Also, preferably, the stop means on the adjusting ring includes a plurality of symmetrically mounted pins, at least one of which is independently rotatable and provided with a section that moves eccentrically relative to the axis about which the pin rotates, for enabling independent adjustment of an associated one of the guide rollers. In another embodiment, the base element in the electrode holder is provided with a drive post, a shoulder, or similar abutment which is engaged by a driving element or member on the electrode discharge machine causing the base element to be rotatively moved about the central axis.

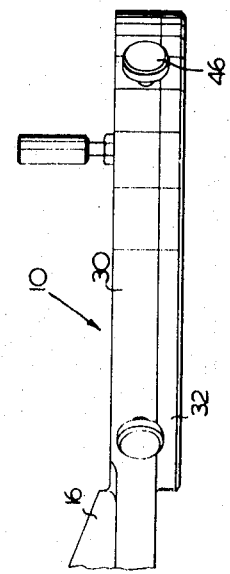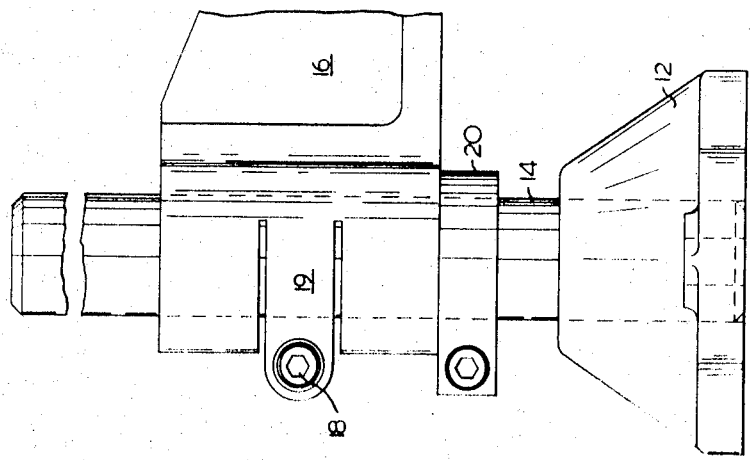
FIG.1

ELECTRODE HOLDER

ELECTRODE HOLDER

This invention relates to an electrode holder. In particular, the invention relates to an electrode holder that is adapted to be used with an electric discharge machine (E.D.M.) to guidingly support the electrically conductive electrode being used in such a machine.

BACKGROUND OF THE INVENTION

Electric discharge machines or electro-erosion apparatus as they are also known are utilized for various "machining" operations on a workpiece, for instance, for shaping, forming blind or through holes, or the like. In the past, however, these electric discharge machines have inherently contained the disadvantage that very little accurate control is available for maintaining the electrode precisely in position. Accurate control is frequently needed, especially in those instances when the electrode size becomes very small, or precise "machining" operations are being carried out. In the manufacture of certain articles such as precision instruments or parts thereof, an electric discharge machine is sometimes used, and it will be apparent that a high degree of accuracy in positioning the electrode of that machine is required.

SUMMARY OF THE INVENTION

The electrode holder to be described below incorporates various improvements therein that have not previously been found in the prior art. This improved electrode holder is adapted to be used with an electric discharge machine to provide highly accurate positioning and guided support of the electrically conductive electrode in that machine. When spark eroding a bore hole of say one thirty-second inch in diameter, or one sixty-fourth inch with the same electric discharge machine, an attempt to provide guidance of the electrode by means of bushings would be ineffective. The bushings would have to be changed every time a different size electrode was to be used, and even more importantly, the bushings would have to be specially produced since they must be a few thousandths of an inch smaller than the bore diameter wanted. Standard, off-the-shelf bushings simply would not be adequate. The present electrode holder overcomes these difficulties by providing a construction which affords continuous adjustment over the working range of the electric discharge machine. Accordingly, there is provided an electrode holder which comprises a main housing that is preferably supported in a support collar of a pedestal stand or the like, with this main housing being generally annular to define a central opening that has a central axis along which the electrode is fed during use. A base element having slot means therein is rotatably supported by the main housing, within the central opening. Adjusting ring means are also supported by the base element to be movable relative thereto, and are provided with stop means which extend through the slots in the base element. Electrically nonconductive guide means are supported by the base element to be disposed symmetrically about the central axis for guidingly engaging the electrode during use. These guide means are biased against the stop means. Adjustment means are also provided to effect relative motion between the base element and the adjusting ring means so as to vary the positioning of said guide means relative to the central axis. In that way, electrodes of various sizes can be accurately guided by the present electrode holder. In one embodiment, the nonconductive guide means include rollers that contact the electrode during use, and these rollers are rotatably supported in a bearing housing that is provided on a cam plate which itself is biased into contact with the stop means on the adjusting ring. Preferably, the stop means are in the form of a rotatable pin which has an eccentric portion thereon such that rotation of that pin effects independent adjustment of the positioning of the associated guide roller.

These and other features and advantages of the present invention will become apparent from the detailed description below, when read in conjunction with the accompanying drawings.

BRIEF DESCRIPTION OF THE DRAWINGS

In the drawings which illustrate by way of example only one preferred embodiment of the present invention.

FIG. 1 is a side elevation view showing one form of the present invention;

DESCRIPTION OF A PREFERRED EMBODIMENT

Figure 2:
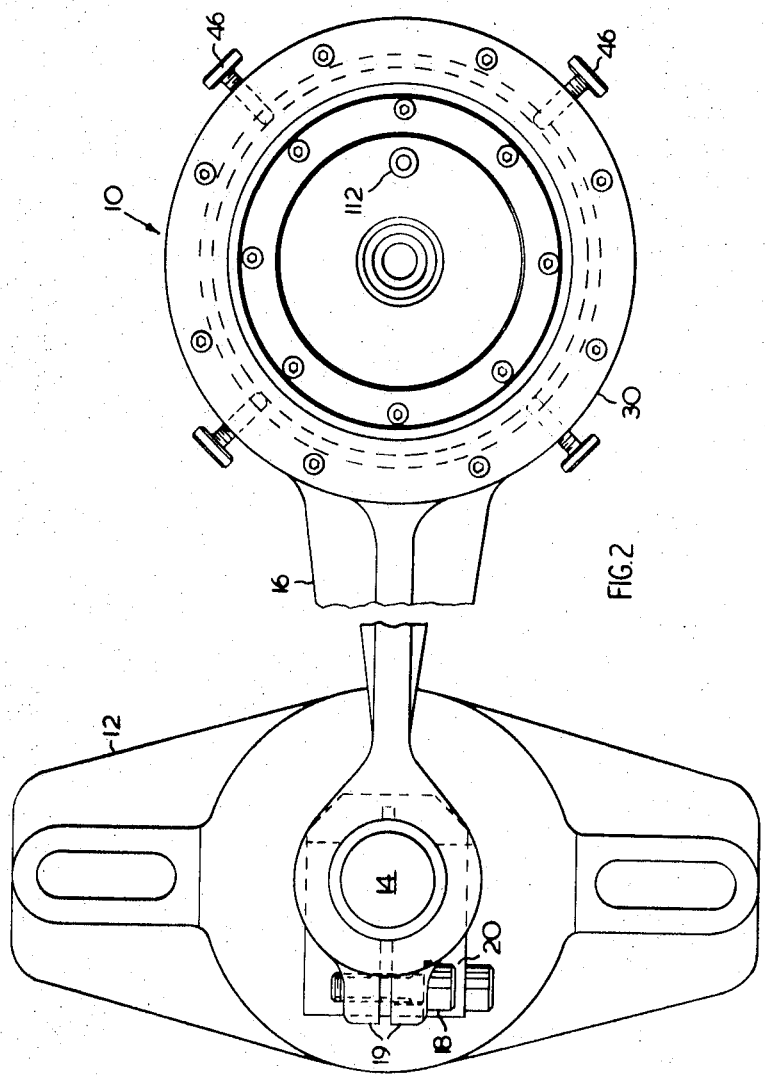
FIG. 2 is a top plan view of the electrode holder of FIG. 1.

Turning now to the drawings, FIGS. 1 and 2 show one embodiment of the present electrode holder, with the numeral 10 designating the electrode holder overall. This electrode holder is preferably supported from a pedestal stand which comprises a pedestal base 12 to which a main column 14 is fixedly attached. The pedestal base 12 is generally horizontally disposed, in use, and will rest upon a flat surface which might be a worktable or similar surface. The main column 14 is generally vertically disposed and a support arm 16 extends outwardly therefrom. This support arm 16 is adapted to be received over the main column 14 with a locking screw 18 being provided on clamping tongues 19, serving to releasably fix the support arm 16 in a selected position. It will be apparent that the locking screw 18 may be in the form of a wing nut or the like which is readily released to allow the support arm 16 to be swung or rotated relative to the main column 14 to reposition the same. In so doing, the electrode holder 10 is itself repositioned. Finally, a positioning collar 20 is also provided on the main column 14, beneath the support arm 16. When the support arm 16 and electrode holder 10 have been positioned at the correct height above a workpiece, this positioning collar is locked firmly in place so as to maintain the electrode holder 10 at a fixed height relative to the workpiece.

Figure 3:
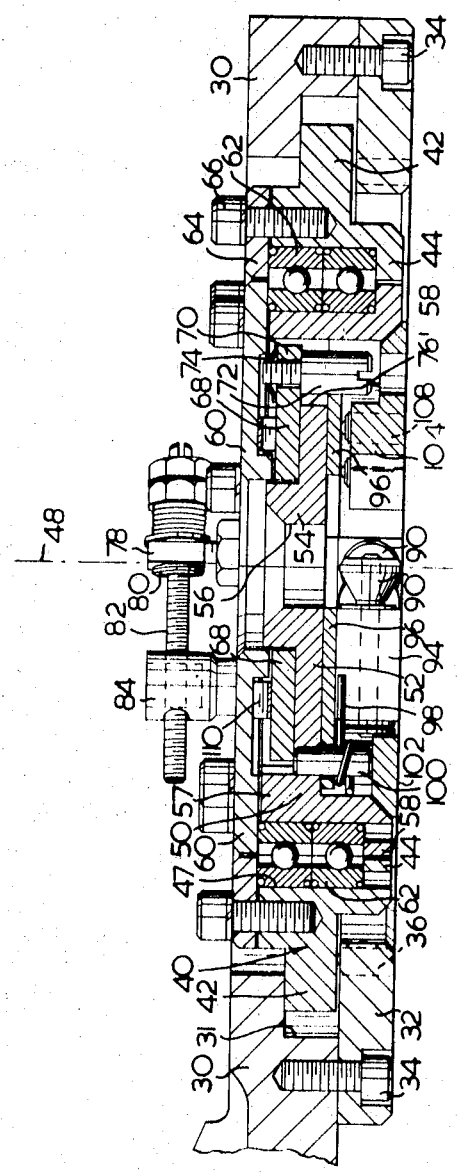
FIG. 3 is a side elevation view taken in section along line 3—3 of FIG. 4.
Figure 4:
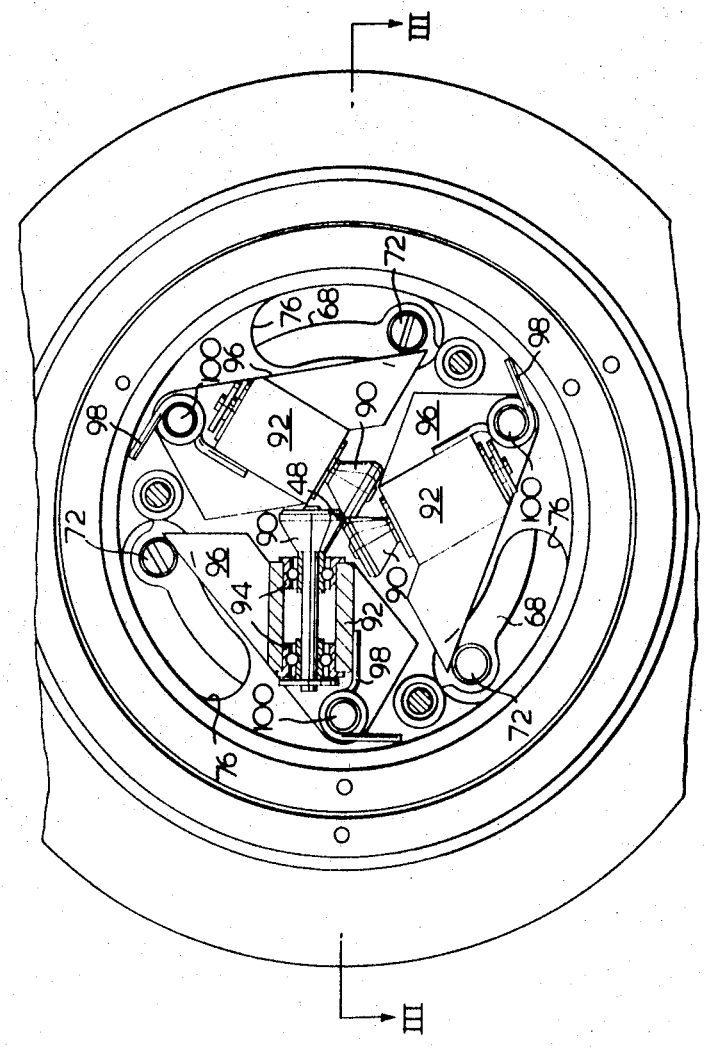
FIG. 4 is a bottom plan view taken from the base side of the electrode holder of FIG. 1, with a lower coverplate having been removed for purposes of clarity.
Figure 5:
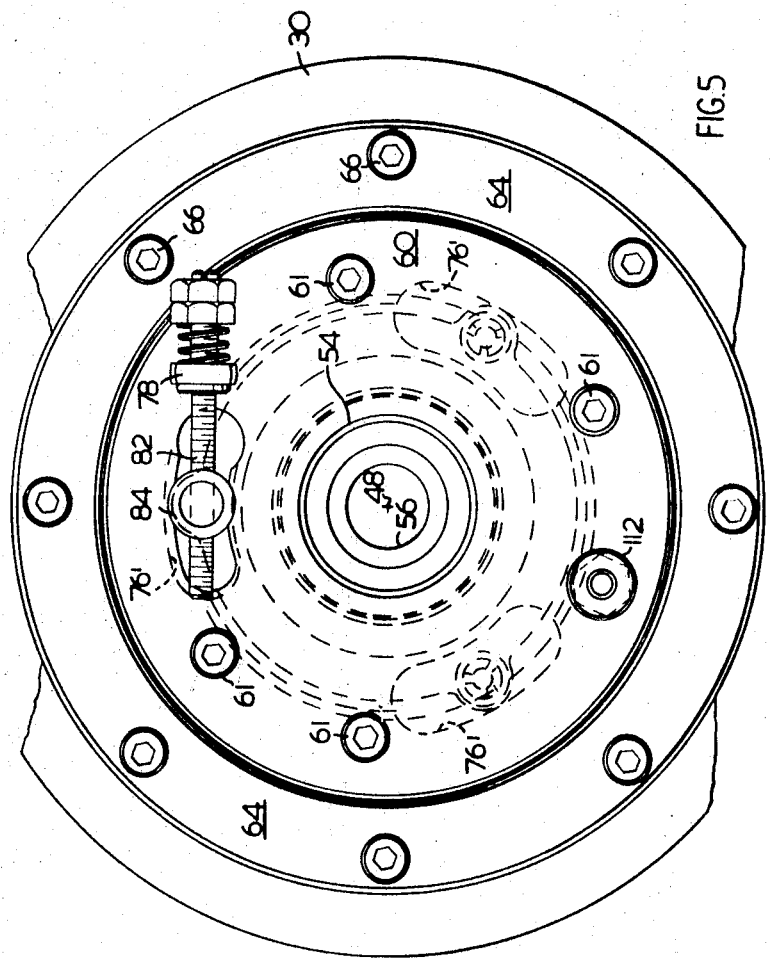
FIG. 5 is a fragmentary top plan view of the present electrode holder.
Figure 6:
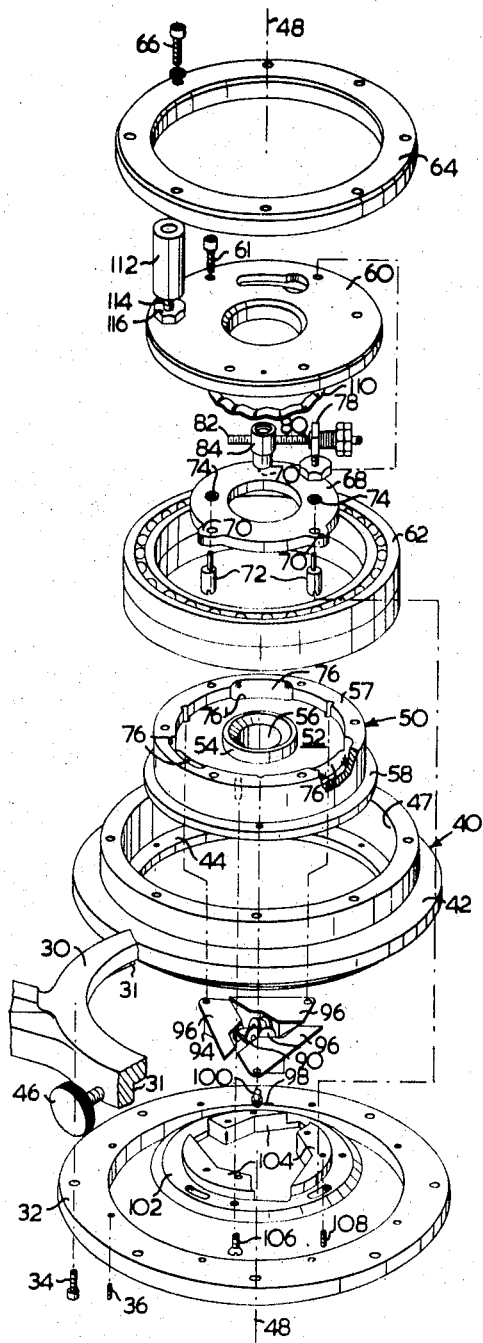
FIG. 6 is an exploded view taken in perspective to show the structural interrelation between various elements in the present electrode holder.

The structural detail of the electrode holder 10 can best be seen from FIGS. 3, 4 and 6. It should initially be noted that the support arm 16 is cast preferably from a nonferrous metal such as aluminum and will usually be formed with a collar 30 whose inwardly facing lower corner is cut away to form a step or shoulder 31. An annular pressure plate 32 is secured by means of screw fasteners 34 to the lower face of the collar 30. The pressure plate 32 is also provided adjacent the inwardly facing edge area of the same with spring-loaded pins 36 which can be seen in FIG. 6. The purpose of these spring-loaded pins 36 will become apparent from the description below.

The electrode holder 10 basically comprises a main housing 40 that is generally annular in shape. See FIG. 6. This main housing 40 is provided with a radially outwardly extending flange 42, and a radially inwardly extending lower flange 44. The outwardly extending flange 42 cooperates with the shoulder 31 and pressure plate 32 to enable the electrode holder 10 to be positioned to be in accurate alignment with the head of the electric discharge machine. To this effect, the collar 30 is provided with a number of thumb screws 46 which can be independently adjusted to effect rough positioning of the electrode holder 10. It is also to be noted that the main housing 40 is annular to define a central opening 47 which has a central axis 48 along which an electrically conductive electrode in the electric discharge machine, is intended to be fed in use. A rotating base element 50 is supported by the main housing 40, in the central opening 47. To this end, the rotating base 50 is formed to be generally circular in configuration and having an inverted dish shape taken in cross section diametrically of the same. Accordingly, the rotating base 50 is provided with a flat "bottom" portion 52 which includes an axially extending inner flange 54 defining a central aperture 56 through which the electrode will be fed. The shape of the rotating base element can best be seen in FIG. 6, from which it will be noted that an axially extending shoulder 57 and a radially extending outer flange 58 are also provided. Shoulder 57 serves to enable a coverplate 60 to be secured to the rotating base element 50 by means of suitable fastening elements such as screws 61, for purposes to be explained below. The radial flange 58 cooperates with the inwardly extending flange 44 on the main housing 40 to retain an instrument-grade bearing, of which two are actually shown collectively at 62. It will be seen especially from FIG. 3, that the inner race of the bearing 62 rests upon the flange 58 while the outer bearing race is supported by the flange 44. The coverplate 60 associated with the rotating base 50 and a corresponding cover or retaining ring 64 on the main housing 40 cooperate with the flanges 44 and 58 on which the bearing races fit to clamp the bearing 62 in place. It is to be appreciated, however, that in actual assembly, the bearing 62 will be pressure fitted onto the shoulders formed by flanges 44 and 58 on the main housing 40 and rotating base 50, respectively. As seen both from FIGS. 3 and 6, the retaining ring 64 is secured to the main housing 40 by means of screw fasteners 66 or the like.

An adjusting ring 68 rests on the bottom portion 52 of the rotating base element 50, surrounding the axially extending flange 54. This adjusting ring 68 is provided with bosses 70 or shoulders peripherally thereof and these bosses are apertured to receive adjusting pin means 72. As seen both in FIGS. 3 and 6, the pin means 72 are retained in place by means of spring clips 74. It is preferable that one and usually two of the pin means 72 are formed in two sections that are generally cylindrical in form and whose axes are offset from one another. In that way, rotation of either section of each pin about either axis causes the other section to move eccentrically about the selected axis of rotation. It will be seen from FIG. 6 that in order to accommodate the bosses 70, the shoulder 57 on rotating base element 50 is cut away as shown at 76. Slots 76' are cut out of "bottom" 52 to receive pins 72. It is also to be noted that in the embodiment shown herein, the smaller cylindrical portion of the adjusting pin 72 rotates within the aperture provided in the bosses 70 and so the enlarged cylindrical section will move eccentrically. The purpose of this will be explained below. An adjusting post 78 is secured to coverplate 60. A cross bore hole 80 is provided in an upper enlarged head section of adjusting post 78 and this bore hole is threaded in order to receive adjusting screw 82. The adjusting screw 82 is supported by means of a carrier post 84 that is secured to the adjusting ring 68. It will therefore be seen that because the adjusting post 78 is secured to the coverplate 60 and carrier post 84 to ring 68 manipulation of the adjusting screw 82 will cause rotational movement of the adjusting ring 68 relative to the coverplate and to base element 50.

As best seen in FIG. 4, three guide means are disposed within the dished out portion of the base element 50, symmetrically about the central axis 48. These guide means in this instance comprise guide rollers 90 that are of an electrically nonconductive material since they engage the electrode of the electric discharge machine. Each of the guide rollers 90 is rotatably supported within a wheel housing 92 on bearings 94 as seen in FIG. 4. This wheel housing 92 is machined to be integral with a shoelike cam plate 96 thus forming a single unit which is biased by a torsion spring 98 to abut against an associated adjusting pin 72. As seen in FIG. 4, one arm of the torsion spring 98 pushes against the wheel housing 92, while the other arm of that spring is in engagement with the inner wall of the base element 50, generally adjacent to the flange 58. The torsion springs 98 are each held in place on a pin 100 which is secured to the bottom 52 of base element 50, and the shoelike cam plates 96 are rotatable about these pins, to be movable relative to the base element. A lower coverplate 102 can be seen in FIG. 6 as having shoulder segments 104 that are approximately of a crescent shape. The orientation of these shoulder segments 104 is such as to allow the wheel housings 92 to be disposed within the regions between such segments. Moreover, the segments are so shaped as to allow rotation of the guide rollers 90, wheel housings 92 and cam plate 96 about the axis of pins 100 so as to enable varying the guide opening which can be seen in FIG. 4, from approximately 0.005 inches to 0.250 inches. Preferably the present electrode holder will be used where electrode diameters are not greater than one-fourth inch. The bottom coverplate 102 is secured to the rotating base element 50 by means of screw fasteners 106. As best seen in FIG. 3, and FIG. 6, the coverplate 102 is also provided with a series of spring-loaded pins 108 that apply a biasing pressure against the cam plates 96, which in turn are seated against the bottom portion 52 of the base element 50. In addition, the adjusting ring 68 is biased through the intermediary of a corrugated washer 110 against the upwardly facing surface of bottom 52, by the coverplate 60 which is also fastened to base element 50. Under those circumstances, the interior assembly which is rotatable on bearing 62 is spring loaded and held securely together.

It will be recognized that in some instances, the electric discharge machine with which the present electrode holder is intended to be used will have means thereon for drivingly engaging the present electrode holder so as to move it along a predetermined path. To this end, a drive post 112 is secured by means of a threaded dowel pin 114 and nut 116 to the rotatable base element 50.

It is to be noted that because of the attachment of adjusting post 78 to the coverplate 60, and of the support post 84 to the adjusting ring 68, turning the threaded adjusting screw 82 will cause relative rotary motion between the plate 68 and the base element 50. As seen in FIG. 4, that rotary motion will be counterclockwise direction and is limited by the travel possible within slots 76' that are provided in the bottom portion 52 of the base element 50. As that adjusting ring 68 is rotated counterclockwise (referring to FIG. 4 again) it will allow the biasing springs 98 to move guide rollers 90 away from the central axis 48 and thus enable a larger diameter electrode to be accommodated. It should be noted, that rotary motion of the adjusting ring 68 will effect adjustment simultaneously of all three guide rollers 90. On the other hand, it was previously indicated that the main housing 40 was adjustably retained between the support collar 30 and the pressure plate 32, and could be adjustably positioned by means of thumb screws 46. It is preferable that two of the adjusting pin means 72 are eccentrically movable so as to allow independent adjustment of the guide roller 90 associated with those eccentric pin means. As seen in FIG. 3, it is to be recognized that rotation of the pin 72, such as by a screwdriver, will cause the upper section to rotate about the axis of the aperture in boss 70, shown at approximately the four o'clock position in FIG. 4. Because the lower enlarged section of pin 72 is axially offset from the upper portion, the enlarged portion will move eccentrically. The toe portion of the shoelike cam plate 96 abuts against this enlarged portion of the adjusting pin 72, and hence, movement of that enlarged portion away from the central axis 48 due to its eccentric relationship to the smaller section housed within the apertured boss 70, will enable independent adjustment of the associated guide roller 90 relative to that central axis. Eccentric pins 72 are provided in order to center the three rollers 90 (normally during assembly only) in relation to bearing 62–this is done in order to have the electrode always centered, especially when it is being rotated with base element 50.

It will be seen from the foregoing that an electrode holder is provided which can accommodate electrodes of various sizes. Moreover these electrodes can be roughly positioned initially by locating the base support arm assembly, and subsequently positioned to a high degree of accuracy by the thumb screws 46. The electrode is guided and supported by the guide means, here the rollers 90, to a location within one-sixteenth inch above the workpiece. According to the present invention, therefore, a versatile and highly flexible electrode holder is provided. It should be noted that while the present description and drawings refer specifically to one preferred embodiment, numerous modifications will be apparent to those skilled in this art. It is intended that all modifications that will be obvious to persons in this art are to be encompassed within the spirit of this invention as defined by the claims below.

The embodiments of the invention in which an exclusive property or privilege is claimed are defined as follows:

1. An electrode holder adapted for use with an electric discharge machine having an electrically conductive electrode of a selected one of a plurality of various sizes, the holder comprising:
    a main housing adapted to be supported from a stand or the like, and being generally annular to define a central opening having a central axis along which the electrode is fed during use;
    a base element coaxially rotatably supported by the main housing and disposed in said central opening, said element having slot means therein;
    ring means supported by the base element to be coaxially rotatable relative thereto and being provided with stop means which extend through said slot means;
    electrically nonconducting guide means disposed symmetrically about said central axis for guidingly engaging the electrode during use, said guide means being supported by the base element and biased against the stop means on the ring means; and
    adjustment means comprising two sections movable relative to one another, one section being connected to the ring means with the other section being connected to the base element such that manipulation of the adjustment means effects relative rotation between the base element and ring means and varies the positioning of said guide means relative to said central axis.

2. The electrode holder of claim 1, wherein the main housing is adjustably supported to enable varying the positioning of said central axis along which the electrode is fed during use.

3. The electrode holder of claim 1, wherein said stop means comprises a plurality of pin means symmetrically mounted on the ring means at least one of which is independently rotatably and is provided with a section that moves eccentrically so as to allow independent adjustment of an associated one of the guide means.

4. The electrode holder of claim 1, wherein driven means are provided on the base element such that engagement thereof by a driving member on the electrode discharge machine causes said base element to be rotatively driven about said central axis.

5. An electrode holder adapted to be used with an electric discharge machine having an electrically conductive electrode of a selected one of a plurality of various sizes, the holder comprising:
    a main housing adapted to be supported from a stand or the like, and being generally annular in configuration, the housing being provided with a central opening having a central axis along which the electrode is fed during use;
    a base element that is generally of an inverted dish shape in cross section diametrically thereof, the base element being coaxially rotatably supported by the main housing to be disposed in the central opening, and having guiding slot means therein;
    ring means slidably supported on the base element to be coaxially rotatable relative thereto, the ring means being provided with stop means that extend through the guiding slot means in the base element;
    electrically nonconductive guide means disposed symmetrically about the central axis for guidingly engaging the electrode during use, said guide means including a base portion that is biased to engage the stop means on said ring means, and a housing portion connected to the base portion, for rotatably supporting guide rollers that contact the electrode to guide the same; and
    adjustment means comprising a first section connected to the ring means and a second section connected to the base element, said sections being operably interconnected such that manipulation of the adjustment means effects relative rotation between the ring means and base element to enable the positioning of the guide rollers to be adjusted relative to said central axis.

6. The electrode holder of claim 5, wherein said stop means comprises at least one adjustable pin that has two portions whose longitudinal axes are spaced apart to enable eccentric motion of one of said portions relative to an axis about which the pin turns, whereby eccentric rotation of a portion of said adjustable pin effects independent adjustment in the positioning of one of said guide rollers.